May 14, 1935.  E. C. JOHNSON  2,001,327
LEVERAGE CHANGING MECHANISM FOR MOTOR VEHICLE BRAKES
Filed Feb. 19, 1934
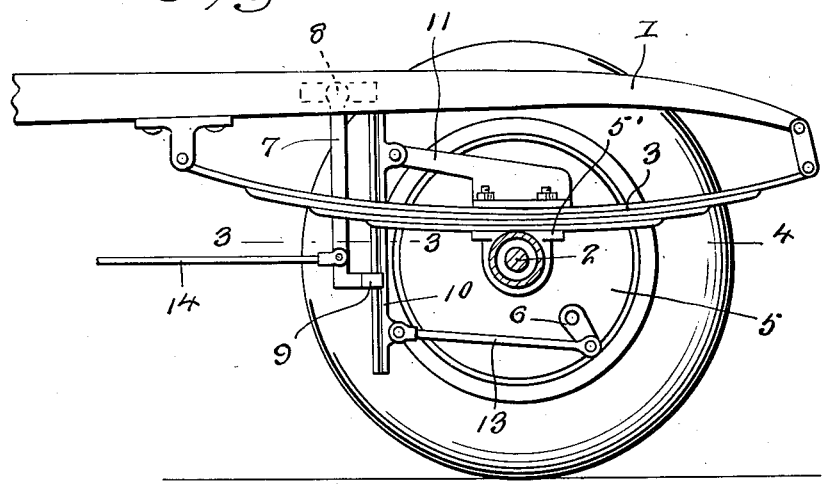
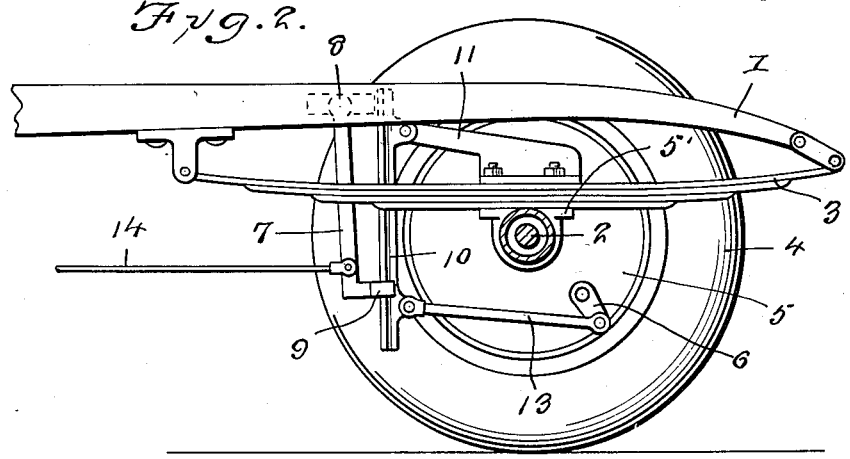
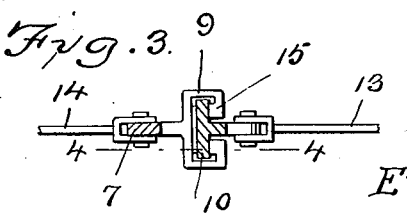
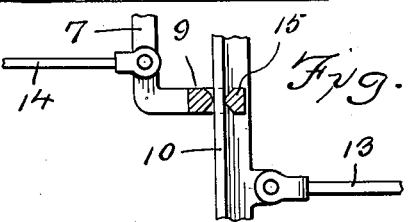
Ernest C. Johnson   INVENTOR
BY Victor J. Evans & Co.
ATTORNEY Patented May 14, 1935

2,001,327

UNITED STATES PATENT OFFICE 2,001,327

LEVERAGE CHANGING MECHANISM FOR MOTOR VEHICLE BRAKES

Ernest C. Johnson, Somerset, Pa.

Application February 19, 1934, Serial No. 712,028

3 Claims. (Cl. 188—195)

This invention relates to power means for motor vehicle brakes and has for the primary object the provision of means for preventing unequal skidding of the wheels of the vehicle under unequal loads on said wheels as well as the unequal pressure of the wheels caused by centrifugal action when traveling on a curve in a roadway so that positive control of the vehicle may be had at all times and which also prevents undue wear on the tires of the wheels by reducing to a minimum the amount of skidding of one wheel at a time.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation partly in section illustrating my invention applied to the chassis and one of the brakes of a motor vehicle.

Figure 2 is a similar view showing an increased load on the wheel from that disclosed in Figure 1 and illustrating the positions occupied by the parts of my invention so that an increased brake applying force will be delivered to the brake from that shown in Figure 1.

Figure 3 is a sectional view taken on the line 3—3 of Figure 1.

Figure 4 is a sectional view taken on the line 4—4 of Figure 3.

While my invention is illustrated in the drawing as applied to one brake of a motor vehicle it is to be understood that each brake of the vehicle may be equipped with my invention by duplication of the parts to each brake.

Referring in detail to the drawing, the numeral 1 indicates a fragmentary portion of the chassis of a vehicle mounted to the axle 2 by a spring 3. The axle carries the usual wheel 4 equipped with a conventional type of brake 5 wherein the operating lever thereof is indicated by the character 6. The foregoing description relates to a well known construction found in motor vehicles and to which my invention is applied.

An arm 7 has one end secured to the chassis 1 adjacent the brake 5 by a ball and socket connection 8 so that said arm depends from the chassis and is free to have pivotal movement. The lower end of the arm is formed with a head 9 which slidably engages a fulcrum bar 10 pivoted adjacent one end to a supporting bracket 11 carried by the vehicle spring mounting 5'. It is to be understood that the bracket 11 is fixed against pivotal movement and that the fulcrum bar depends therefrom and adjacent its lower end is pivotally connected to a link 13 which is in turn pivotally connected to the brake lever 6. Brake applying force is delivered to the arm 7 adjacent its lower end by the rod 14, the latter forming part of the ordinary brake rigging found on a motor vehicle. While this invention is shown as operating in conjunction with a mechanical brake it is to be understood that it may be readily adapted to hydraulic brakes. The arm 7 and fulcrum bar 10 are free to have sliding movement relative to each other, the fulcrum bar being of substantially T-shape in cross section so as to provide oppositely arranged flanged portions engaged by finger-like portions 15 constituting an integral part of the head 9.

It is to be understood that the brakes of the vehicle are adjusted or equalized in the usual manner so that during operation of the vehicle with my invention applied thereto the brake operating force to the wheel which has an increased load over that of the other wheels will receive an increased amount of pressure applying force. This is accomplished by the arm 7 shifting its positions on the fulcrum bar in accordance with the increase and decrease of the load to the wheel of the respective brake. It will be apparent from the drawing, especially Figures 1 and 2, the varying of the position of the arm 7 with respect to the fulcrum bar. Figure 1 shows the position of the parts when the wheel is under a normal load and when the load is increased the parts assume positions as shown in Figure 2, the spring 3 being shown flexed to a greater degree than that shown in Figure 1. The connection between the arm 7 and the fulcrum bar moves towards and from the main fulcrum point of the fulcrum bar as the load decreases and increases.

My invention consists of a minimum number of parts so that the manufacture thereof may be maintained at a low cost and also the parts are so arranged or designed that they may be easily and quickly installed to a vehicle and its brake rigging without any major alterations.

Having described the invention, I claim:

1. A power means for motor vehicle brakes comprising a fulcrum bar having a fixed fulcrum adjacent one end and connected to a brake operating lever adjacent its opposite end, and a force applying means slidably connected to the bar and influenced by varying loads to change its point of connection with said bar between the latter's fixed fulcrum and its connection to the brake operating lever.

2. A power means for motor vehicle brakes comprising a fulcrum bar, a bracket pivoted to said bar adjacent one of the ends of the latter and fixed to a spring mounting of a vehicle to form a fulcrum for said bar with the latter depending from the bracket, means connecting the bar adjacent its lower end to a brake operating lever, and an arm slidably connected to the bar for movement endwise of the latter and pivotally connected to the frame of a motor vehicle and having a brake rigging of said vehicle connected thereto adjacent the latter's connection to said bar.

3. A power means for motor vehicle brakes comprising a fulcrum bar, a fixed fulcrum for said bar with the latter depending therefrom, means connecting the bar to a brake operating lever, an arm slidably connected to the bar and movable endwise thereof, and a ball and socket connection between one end of the arm and a frame of a motor vehicle, said arm having a brake rigging of a motor vehicle connected thereto adjacent its point of connection with the bar.

ERNEST C. JOHNSON.